(12) United States Patent
Lee et al.

(10) Patent No.: US 8,627,540 B2
(45) Date of Patent: Jan. 14, 2014

(54) WIPER DEVICE IMPROVING SEPARATION FUNCTION OF WIPER BLADE

(71) Applicants: Jeong Byung Lee, Chuncheon-si (KR); Kyoung Ho Ko, Incheon (KR)

(72) Inventors: Jeong Byung Lee, Chuncheon-si (KR); Kyoung Ho Ko, Incheon (KR)

(73) Assignee: Dongyang Mechatronics Corp. (KR)

( * ) Notice: Subject to any disclaimer, the term of this patent is extended or adjusted under 35 U.S.C. 154(b) by 0 days.

(21) Appl. No.: 13/717,087

(22) Filed: Dec. 17, 2012

(65) Prior Publication Data
US 2013/0239354 A1    Sep. 19, 2013

(30) Foreign Application Priority Data
Mar. 13, 2012 (KR) .......................... 10-2012-0025673

(51) Int. Cl.
*B60S 1/40* (2006.01)
*B60S 1/34* (2006.01)
*B60S 1/38* (2006.01)

(52) U.S. Cl.
USPC .................. 15/250.32; 15/250.351; 15/250.44

(58) Field of Classification Search
USPC ............. 15/250.32, 250.351, 250.31, 250.44, 15/250.352, 250.43, 250.361
See application file for complete search history.

(56) References Cited

U.S. PATENT DOCUMENTS

| | | | | |
|---|---|---|---|---|
| 6,594,854 B1 * | 7/2003 | Matsumoto et al. | ....... | 15/250.32 |
| 7,832,046 B2 * | 11/2010 | Lee et al. | ................... | 15/250.32 |
| 8,307,492 B2 * | 11/2012 | Espinasse | ................. | 15/250.32 |

FOREIGN PATENT DOCUMENTS

| | | | |
|---|---|---|---|
| FR | 2838693 | * | 10/2003 |
| JP | 2005-75050 | * | 3/2005 |
| KR | 20040075373 A | | 8/2004 |

* cited by examiner

*Primary Examiner* — Gary Graham
(74) *Attorney, Agent, or Firm* — St. Onge Steward Johnston & Reens LLC

(57) ABSTRACT

A wiper device having an improved function of separating a wiper blade. The wiper device includes: a wiper blade including: a wiper rib for cleaning a glass of a vehicle; a lever member supporting the wiper rib; and a rotary shaft disposed across opposite side walls of a penetration hole formed in a center portion of the lever member, and including a rotary shaft that has a non-circular cross section; a retainer including a receiving recess including an opening corresponding to the non-circular cross section so as to detachably receive the rotary shaft; and an index unit indicating a position where the wiper blade is coupled to or separated from the retainer while the wiper blade is rotated with respect to the retainer within a predetermined angle range.

4 Claims, 11 Drawing Sheets

WIPER DEVICE IMPROVING SEPARATION FUNCTION OF WIPER BLADE

FIELD OF THE INVENTION

The present invention relates to a wiper device for vehicles, and more particularly, to a coupling structure of a wiper blade and a retainer.

BACKGROUND OF THE INVENTION

In general, a rear wiper sometimes needs to be installed on a rear glass of a vehicle according to an inclined angle of the rear glass. A rear wiper is not generally provided on a rear glass of a vehicle of a notch-back style that is called a sedan, but on a hatch-back style vehicle such as a sports utility vehicle (SUV) that essentially has a rear wiper on a rear glass thereof, because that dust is likely to get stuck on the rear glass due to low pressure on the rear glass during driving.

An example of a vehicle having a conventional rear wiper 1 on a rear glass thereof is shown in FIG. 1. In general, a rear wiper consists of a plurality of components. Such a wiper device is disclosed in Korean Patent Publication No. 0500581.

A conventional wiper device 1 includes an arm head 2 driven by a wiper motor (not shown), a retainer 3 coupled to the arm head 2, and a wiper blade 4 detachably assembled on the retainer 3. The wiper blade 4 is generally an expendable component that is worn by glass, and thus, is frequently replaced with a new one.

Therefore, the wiper blade 4 is assembled so as to be detached at a position rotated at a predetermined angle with respect to the retainer 3 as shown in FIG. 2. That is, as shown in FIG. 2, the wiper blade 4 includes a rotary shaft 5 having a non-circular cross section, and the retainer 3 includes a circular recess 6 having an opened side to receive the rotary shaft 5. The circular recess 6 may be coupled to the rotary shaft 5 at only a predetermined angle. That is, the non-circular cross section of the rotary shaft 5 passes through the opened side of the circular recess so that the wiper blade 4 and the retainer 3 are coupled to or separated from each other. However, the non-circular cross section of the rotary shaft 5 is invisible from outside in a state where the wiper device 1 is installed on a vehicle. Therefore, when a user wants to replace the wiper blade 4 with a new one, the user has to find the non-circular cross section of the rotary shaft 5 instinctively while rotating the wiper blade 4 relative to the retainer 3, and thus, the user may be inconvenienced. Also, since the user may not know the separating position of the wiper blade 4 exactly, the wiper blade 4 or the retainer 3 is likely to be damaged if the user forcedly separates the wiper blade 4 from the retainer 3.

SUMMARY OF THE INVENTION

The present invention provides a wiper device having an improved structure so that a use may recognize a separating position of a wiper blade from a retainer easily.

According to an aspect of the present invention, there is provided a wiper device having an improved separating function of a wiper blade, the wiper device including: the wiper blade including: a wiper rib for cleaning a glass of a vehicle; a lever member supporting the wiper rib; and a rotary shaft disposed across opposite side walls of a penetration hole formed in a center portion of the lever member, the rotary shaft including a non-circular cross section; a retainer comprising a receiving recess including an opening corresponding to the non-circular cross section so as to detachably receive the rotary shaft; and an index unit indicating a position where the wiper blade is coupled to or separated from the retainer while the wiper blade is rotated with respect to the retainer within a predetermined angle range.

The index unit may include: a cantilever-shaped protrusion disposed in front of the rotary shaft of the wiper blade, and protruding from an inner wall of the penetration hole; and a sensor disposed on a front end portion of the retainer and contacting the cantilever-shaped protrusion while the wiper blade is rotated with respect to the retainer so that a user recognizes the position where the wiper blade and the retainer are coupled to or separated from each other.

A pair of the cantilever-shaped protrusions may be symmetrically formed.

The index unit may include: a shaft protrusion disposed on the rotary shaft of the wiper blade and protruding in a radial direction of the rotary shaft; and a shaft protrusion receiving recess extending from a receiving recess of the retainer and which is rotatable within a predetermined angle range while receiving the shaft protrusion so that the user recognizes the position where the wiper blade and the retainer are coupled to or separated from each other.

The index unit may include: a bridge disposed in front of the rotary shaft of the wiper blade and formed to connect opposite inner walls of the penetration hole to each other; and a contact portion disposed on a front end portion of the retainer and contacting the bridge while the wiper blade is rotated with respect to the retainer so that the user recognizes the position where the wiper blade and the retainer are coupled to or separated from each other.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described with reference to accompanying drawings.

Three embodiments of the present invention will be described below in detail.

Figure 1:
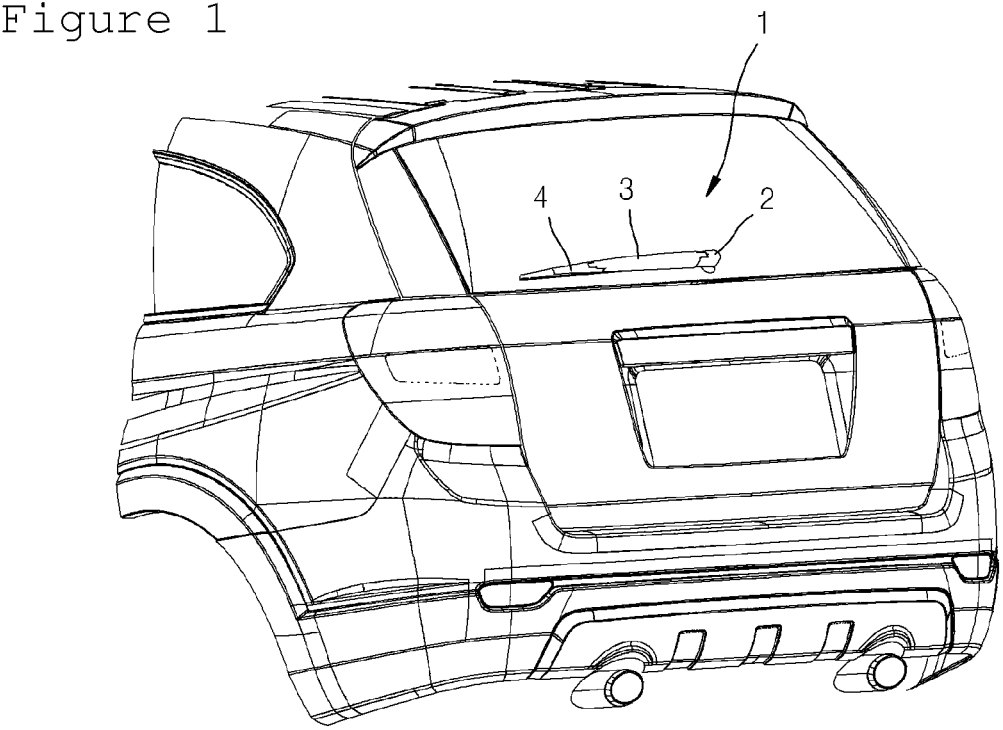
FIG. 1 is a schematic diagram of a vehicle on which a general wiper device is installed.
Figure 2:
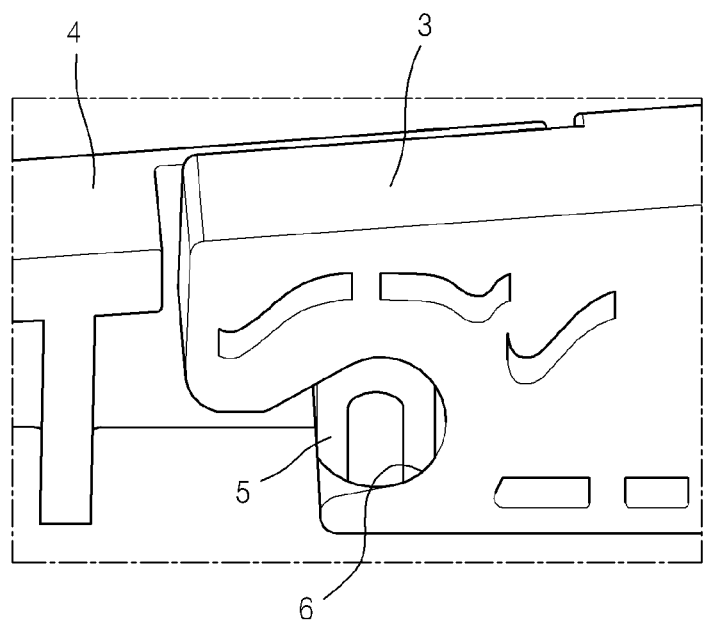
FIG. 2 is a diagram illustrating an assembling structure of a conventional wiper device.
Figure 3:
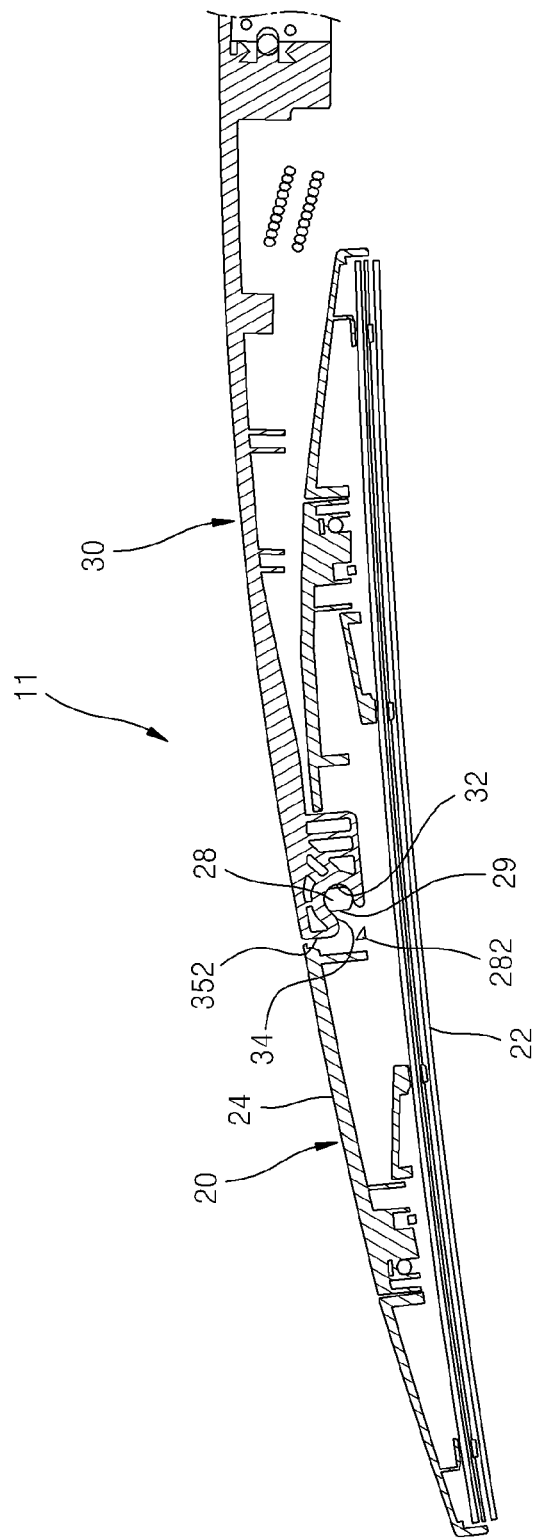
FIG. 3 is a diagram showing a structure of a wiper device according to an embodiment of the present invention.
Figure 4:
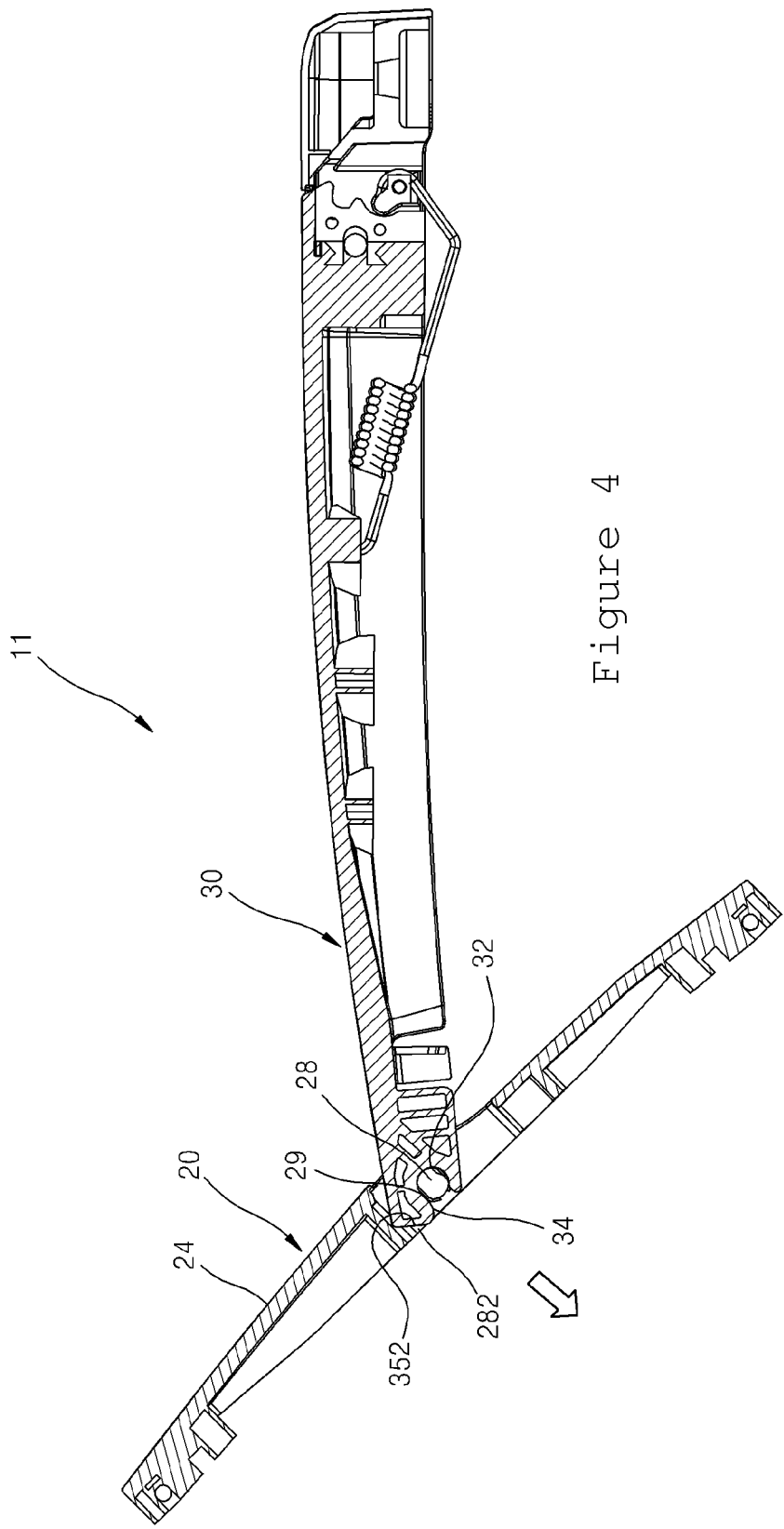
FIG. 4 is a diagram showing a separating position of a wiper blade and a retainer in the wiper device of FIG. 3.
Figure 5:
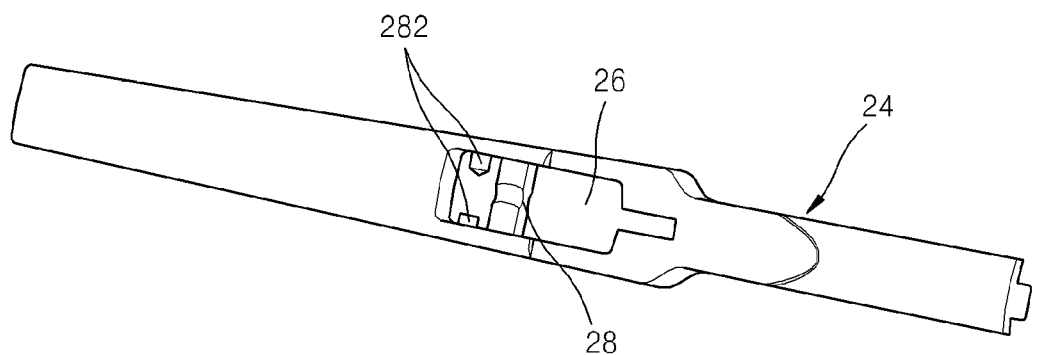
FIG. 5 is a diagram showing a main structure of the wiper device shown in FIG. 3.

FIG. 3 is a diagram showing a structure of a wiper device 11 according to an embodiment of the present invention, FIG. 4 is a diagram showing a separating position of a wiper blade 20 and a retainer 30 in the wiper device 11 shown in FIG. 3, and FIG. 5 is a diagram showing a main structure of the wiper blade in the wiper device of FIG. 3.

Referring to FIGS. 3 through 5, the wiper device 11 having an improved function of separating a wiper blade according to an embodiment of the present invention includes the wiper blade 20 and the retainer 30.

The wiper blade 20 includes a wiper rib 22 and a lever member 24. The wiper rib 22 is formed of a material having excellent flexibility such as rubber. The wiper rib 22 removes impurities on the glass of a vehicle by sliding on the glass of a vehicle while contacting the glass. That is, the wiper rib 22 cleans the glass. The lever member 24 is a member making the wiper rib 22 be firmly supported on the glass, and compresses the wiper rib 22 toward the glass surface. The lever member 24 generally includes a plurality of components. A member disposed on a center portion of the lever member 24 is referred to as a main lever. The main lever includes a structure for detachably coupling the retainer 30 and the lever member 24 on a center portion thereof. That is, the main lever includes a penetration hole 26. The penetration hole 26 penetrates through an upper surface and a lower surface of the main lever. A rotary shaft 28 is disposed across opposite side walls of the penetration hole 26. That is, the rotary shaft 28 is disposed in a width direction of the lever member 24. The rotary shaft 28 may be integrally formed with the lever member 24, or may be fabricated as an additional component to be coupled to the lever member 24, if necessary. The rotary shaft 28 includes a non-circular cross-section 29. The non-circular cross section 29 is formed to prevent the wiper blade 20 from separating unexpectedly from the retainer 30 during operation, by only assembling or separating the wiper blade 20 with or from the retainer 30 at a predetermined position.

The retainer 30 is a rod-shaped member. An end portion of the retainer 30 is coupled to an arm head. The other end portion of the retainer 30 is coupled to the wiper blade 20. The retainer 30 includes a receiving recess 32 that may receive the rotary shaft 28 to be detachable. The receiving recess 32 includes an opening 34 corresponding to the non-circular cross section 29 of the rotary shaft 28.

The present invention is characterized in that a user may recognize a coupling position or a separating position of the wiper blade 20 and the retainer 30 while performing a coupling operation or a separating operation. That is, the wiper device 11 includes an index unit that indicates the separating or coupling position of the wiper blade 20 from or to the retainer 30 when the wiper blade 20 rotates with respect to the retainer 30 within a predetermined angle range.

The index unit includes a protrusion 282 and a sensor 352.

The protrusion 282 is disposed on the wiper blade 20. In more detail, the protrusion 282 is disposed in front of the rotary shaft 28 of the wiper blade 20. The protrusion 282 is a cantilever-shaped protrusion protruding from an inner wall of the penetration hole 26. In the present embodiment, a pair of protrusions 282 disposed is symmetrically disposed.

The sensor 352 is disposed on a front end portion of the retainer 30. The sensor 352 contacts the protrusion 282 when the wiper blade 20 rotates with respect to the retainer 30 so that the user may recognize the separating position and the assembling position of the wiper blade 20 and the retainer 30. That is, the wiper blade 20 and the retainer 30 may be separated from or coupled to each other at a position where the sensor 352 contacts the protrusion 282.

Hereinafter, operational effects of the index unit will be described in more detail.

FIG. 4 shows a state where the protrusion 282 and the sensor 352 contact each other. That is, the wiper blade 20 and the retainer 30 are naturally coupled to each other at the position shown in FIG. 4. On other positions than the position shown in FIG. 4, the coupling or separating operation of the wiper blade 20 and the retainer 30 is impossible. Therefore, the wiper blade 20 and the retainer 30 are disposed as a state shown in FIG. 4, and then, the rotary shaft 28 is inserted in the receiving recess 32 and rotated as a state shown in FIG. 3, and accordingly, the wiper blade 20 and the retainer 30 are coupled to each other. In a state shown in FIG. 3, if there is a need to replace the wiper blade 20 with a new one, the wiper blade 20 is rotated with respect to the retainer 30 to the state shown in FIG. 4. In the state shown in FIG. 4, the wiper blade 20 is not rotated further since the sensor 352 contacts the protrusion 282, and thus, the user may easily recognize the coupling or separating position.

Hereinafter, a wiper device according to another embodiment of the present invention will be described below.

Figure 6:
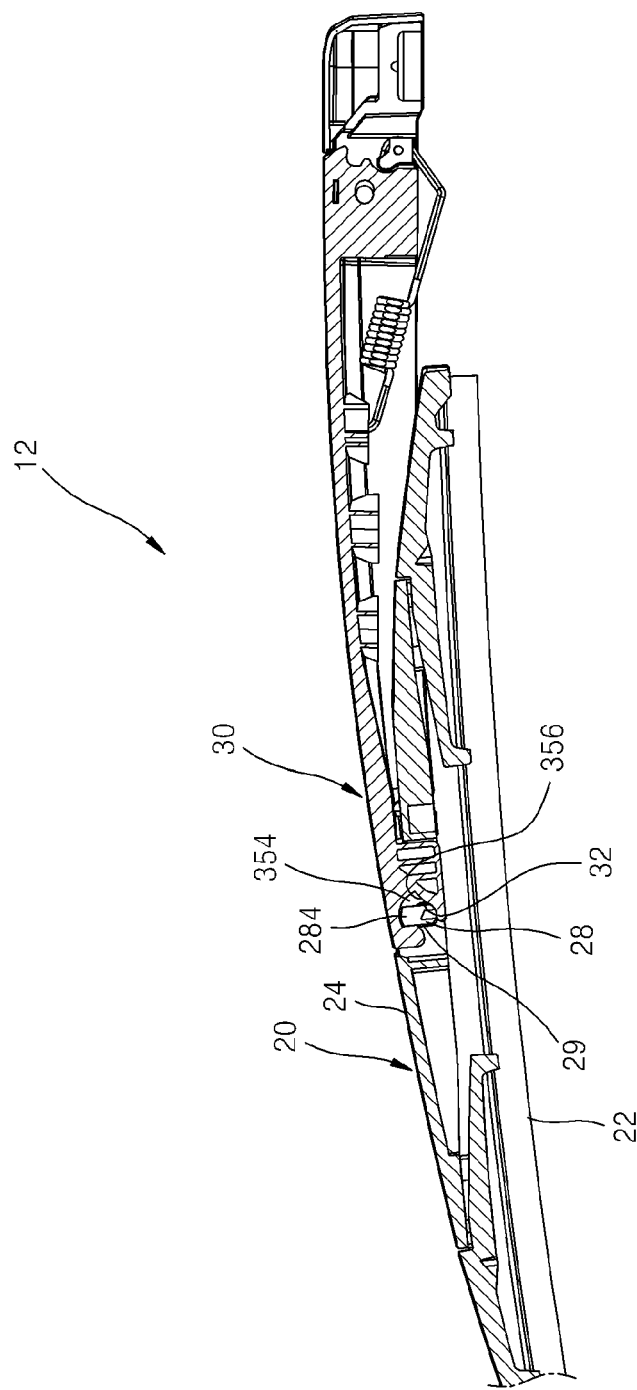
FIG. 6 is a diagram showing a structure of a wiper device according to another embodiment of the present invention.
Figure 7:
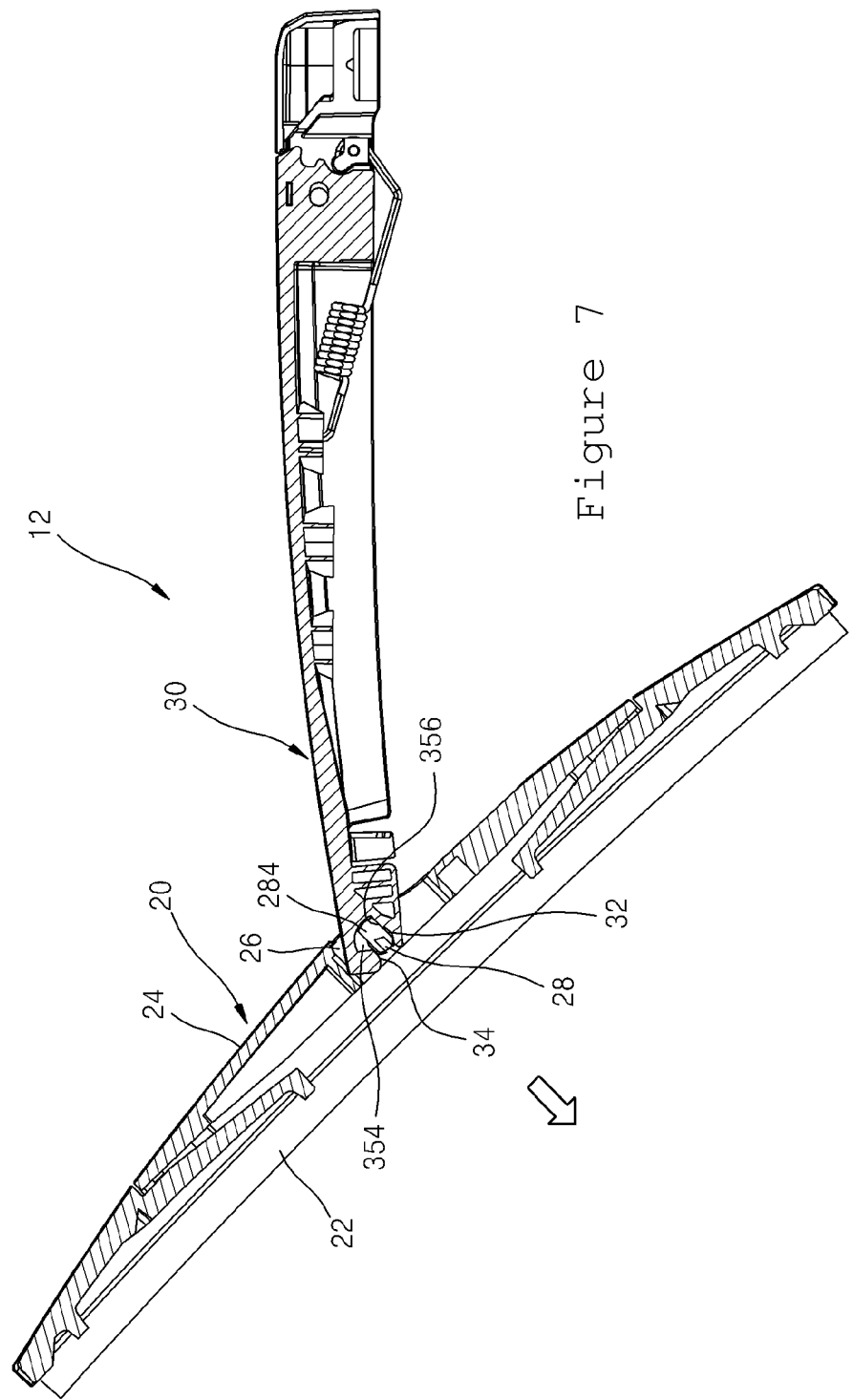
FIG. 7 is a diagram showing a separating position of a wiper blade and a retainer in the wiper device of FIG. 6.
Figure 8:
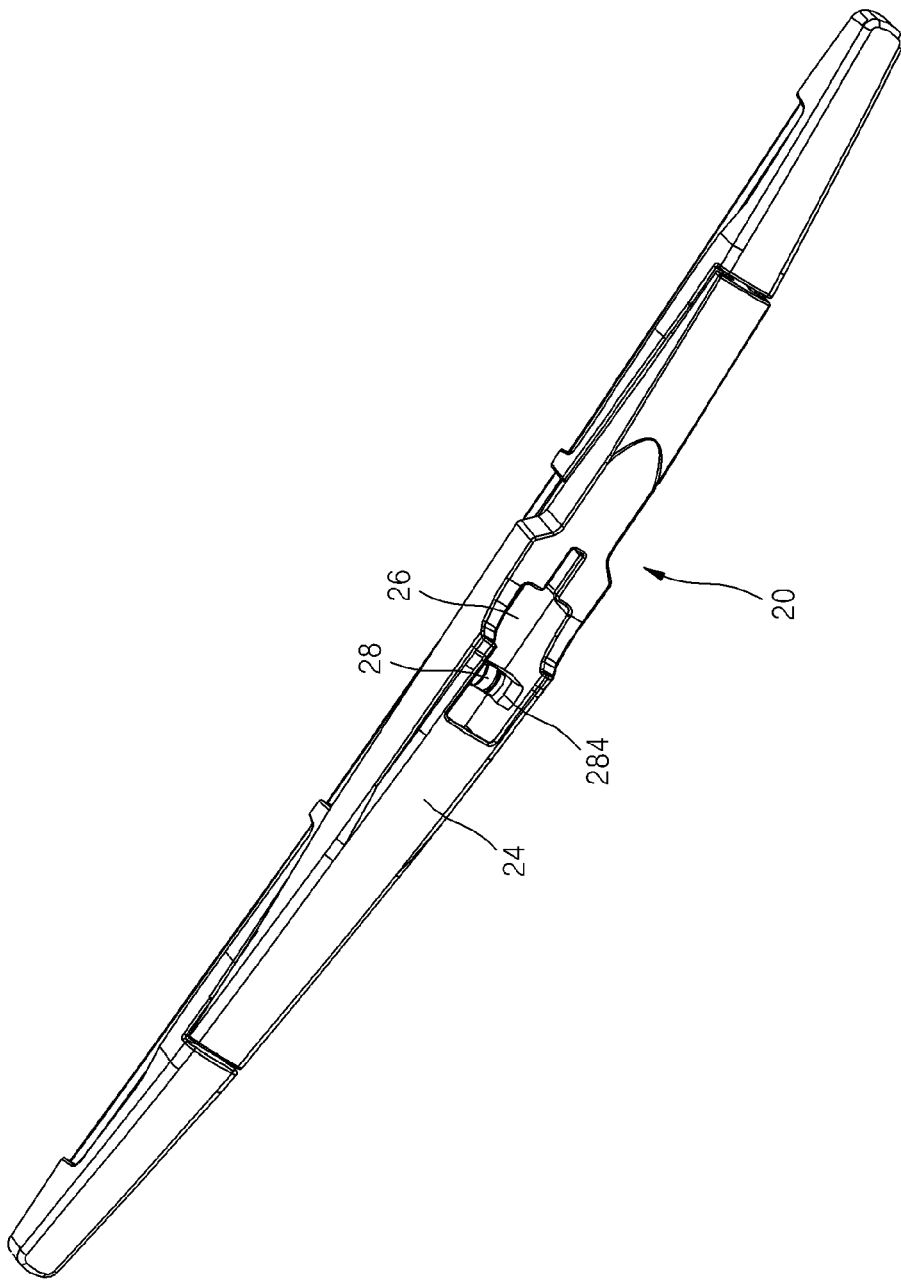
FIG. 8 is a diagram showing a main structure of the wiper blade in the wiper device shown in FIG. 6.
Figure 9:
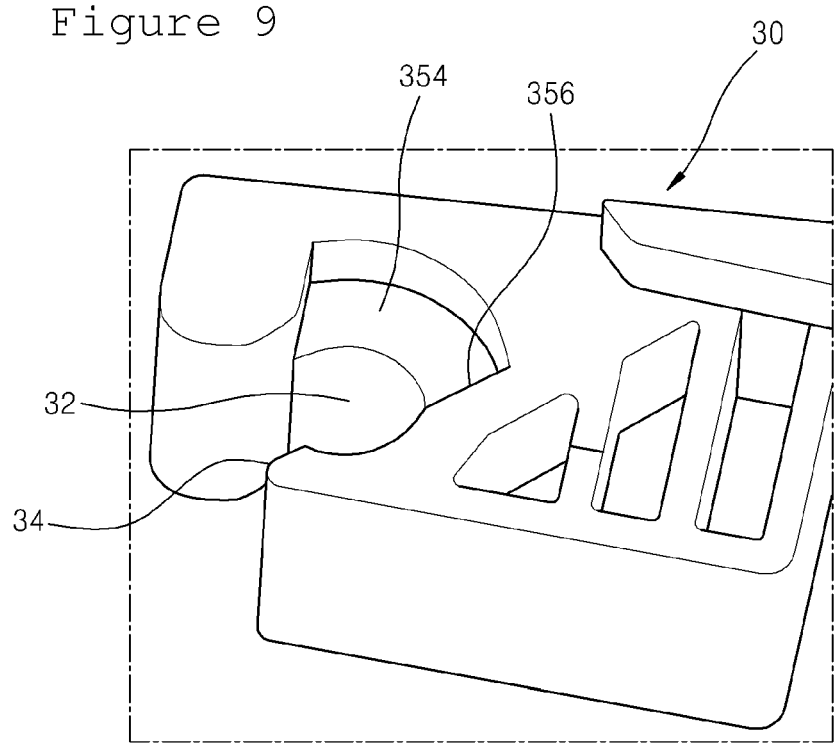
FIG. 9 is a main structure of the retainer in the wiper device of FIG. 6.

FIG. 6 is a diagram showing a structure of a wiper device 12 according to another embodiment of the present invention, FIG. 7 is a diagram showing a separating position between a wiper blade 20 and a retainer 30 in the wiper device 12 shown in FIG. 6, and FIG. 8 is a diagram showing a main structure of the wiper blade 20 in the wiper device 12 of FIG. 6. FIG. 9 is a diagram showing a main structure of the retainer 30 in the wiper device 12 of FIG. 6.

Referring to FIGS. 6 through 9, the wiper device 12 having an improved structure for separating the wiper blade according to another embodiment of the present invention includes the wiper blade 20 and the retainer 30.

The wiper blade 20 includes the wiper rib 22 and the lever member 24. The wiper rib 22 is formed of a material having excellent flexibility such as rubber. The wiper rib 22 removes impurities on the glass of a vehicle by sliding on the glass of the vehicle while contacting the glass. That is, the wiper rib 22 cleans the glass. The lever member 24 is a member making the wiper rib 22 be firmly supported on the glass, and compresses the wiper rib 22 toward the glass surface. The lever member 24 generally includes a plurality of components. A member disposed on a center portion of the lever member 24 is referred to as a main lever. The main lever includes a structure for detachably coupling the retainer 30 and the lever member 24 on a center portion thereof. That is, the main lever includes a penetration hole 26. The penetration hole 26 penetrates through an upper surface and a lower surface of the main lever. A rotary shaft 28 is disposed across opposite side walls of the penetration hole 26. That is, the rotary shaft 28 is disposed in a width direction of the lever member 24. The rotary shaft 28 may be integrally formed with the lever member 24, or may be fabricated as an additional component to be coupled to the lever member 24, if necessary. The rotary shaft 28 includes a non-circular cross-section 29. The non-circular cross section 29 is formed to prevent the wiper blade 20 from separating unexpectedly from the retainer 30 during operation, by only assembling or separating the wiper blade 20 with or from the retainer 30 at a predetermined position.

The retainer 30 is a rod-shaped member. An end portion of the retainer 30 is coupled to an arm head. The other end portion of the retainer 30 is coupled to the wiper blade 20. The retainer 30 includes a receiving recess 32 that may receive the rotary shaft 28 to be detachable. The receiving recess 32 includes an opening 34 corresponding to the non-circular cross section 29 of the rotary shaft 28.

The present invention is characterized in that a user may recognize a coupling position or a separating position of the wiper blade 20 and the retainer 30 while performing a coupling operation or a separating operation. That is, the wiper device 12 includes an index unit that indicates the separating or coupling position of the wiper blade 20 from or to the retainer 30 when the wiper blade 20 rotates with respect to the retainer 30 within a predetermined angle range.

The index unit includes a shaft protrusion 284 and a shaft protrusion receiving recess 354.

The shaft protrusion 284 is disposed on the wiper blade 20. In more detail, the shaft protrusion 284 is disposed on the rotary shaft 28 of the wiper blade 20. The shaft protrusion 284 protrudes from the rotary shaft 28 in a radial direction of the rotary shaft 28.

The shaft protrusion receiving recess 354 extends from the receiving recess 32 of the retainer 30. The shaft protrusion receiving recess 354 is disposed to be rotatable within a predetermined angle range while receiving the shaft protrusion 284. The shaft protrusion receiving recess 354 enables the shaft protrusion 284 to notify the user of the separating and assembling positions of the wiper blade 20 and the retainer 30. That is, the shaft protrusion 284 may move in the shaft protrusion receiving recess 354, and when the shaft protrusion 284 contacts a side wall of the shaft protrusion receiving recess 354, that is, a sensing wall 356, the wiper blade 20 may be coupled to or separated from the retainer 30. In addition, when the shaft protrusion 284 is separated from the sensing wall 356 of the shaft protrusion receiving recess 354, the wiper blade 20 is not separate from the retainer 30. FIG. 8 shows a structure of the shaft protrusion 284 in more detail, and FIG. 9 shows a structure of the shaft protrusion receiving recess 354 in more detail.

Hereinafter, operational effects of the index unit will be described in detail below.

FIG. 7 shows a state where the shaft protrusion 284 and the sensing wall 356 contact each other. That is, in the state shown in FIG. 7, the wiper blade 20 and the retainer 30 are coupled to or separated from each other. In other states than the state shown in FIG. 7, the coupling or separating of the wiper blade 20 and the retainer 30 is impossible. Therefore, the wiper blade 20 and the retainer 30 are arranged in the state shown in FIG. 7, and then, the rotary shaft 28 is inserted in the receiving recess 32 and rotated to the state shown in FIG. 6, and accordingly, the wiper blade 20 and the retainer 30 are coupled to each other. If there is a need to replace the wiper blade 20 with a new one in the state of FIG. 6, the wiper blade 20 is rotated with respect to the retainer 30 to the state shown in FIG. 7. In the state shown in FIG. 7, the sensing wall 356 contacts the shaft protrusion 284 and the wiper blade 20 is not rotated any more, and thus, the user may easily recognize the coupling or separating position. In addition, since the shaft protrusion 284 is disposed on the rotary shaft 28, a strength of the rotary shaft 28 may be improved. Therefore, according to the wiper device 12 according to the present embodiment, the user may easily recognize the separating and coupling position of the wiper blade 20 and the retainer 30, and a durability of the wiper blade 20 may be increased.

Figure 10:
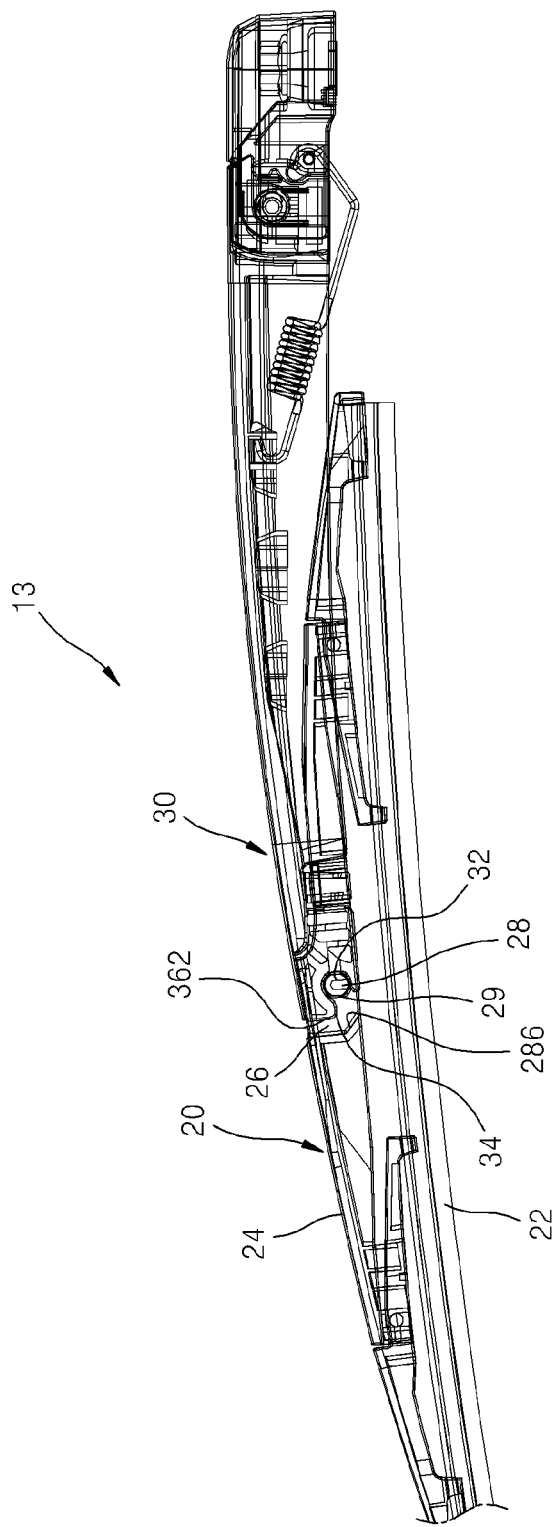
FIG. 10 is a diagram showing a structure of a wiper device according to another embodiment of the present invention.
Figure 11:
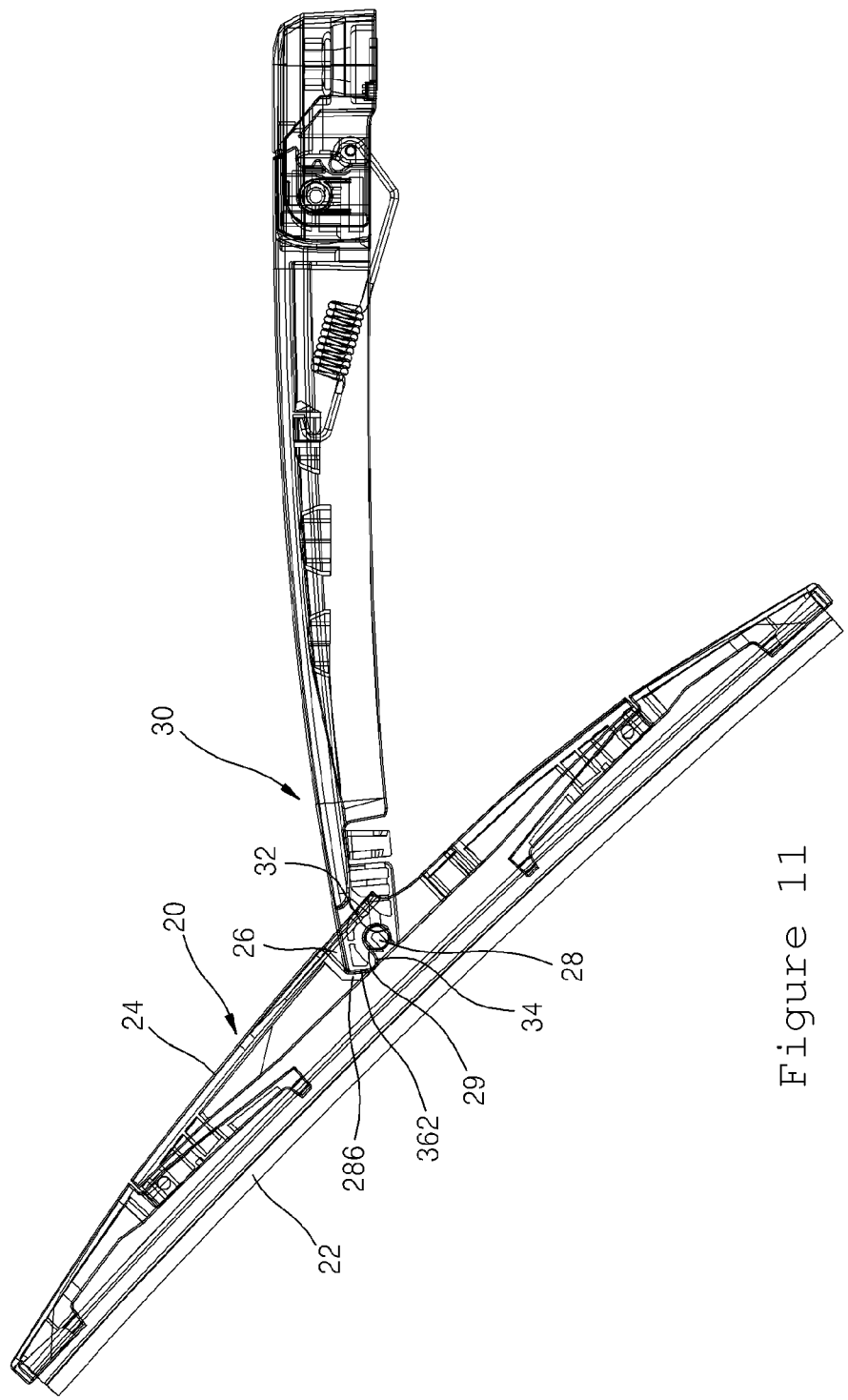
FIG. 11 is a diagram showing a separating position of a wiper blade and a retainer in the wiper device shown in FIG. 10.
Figure 12:
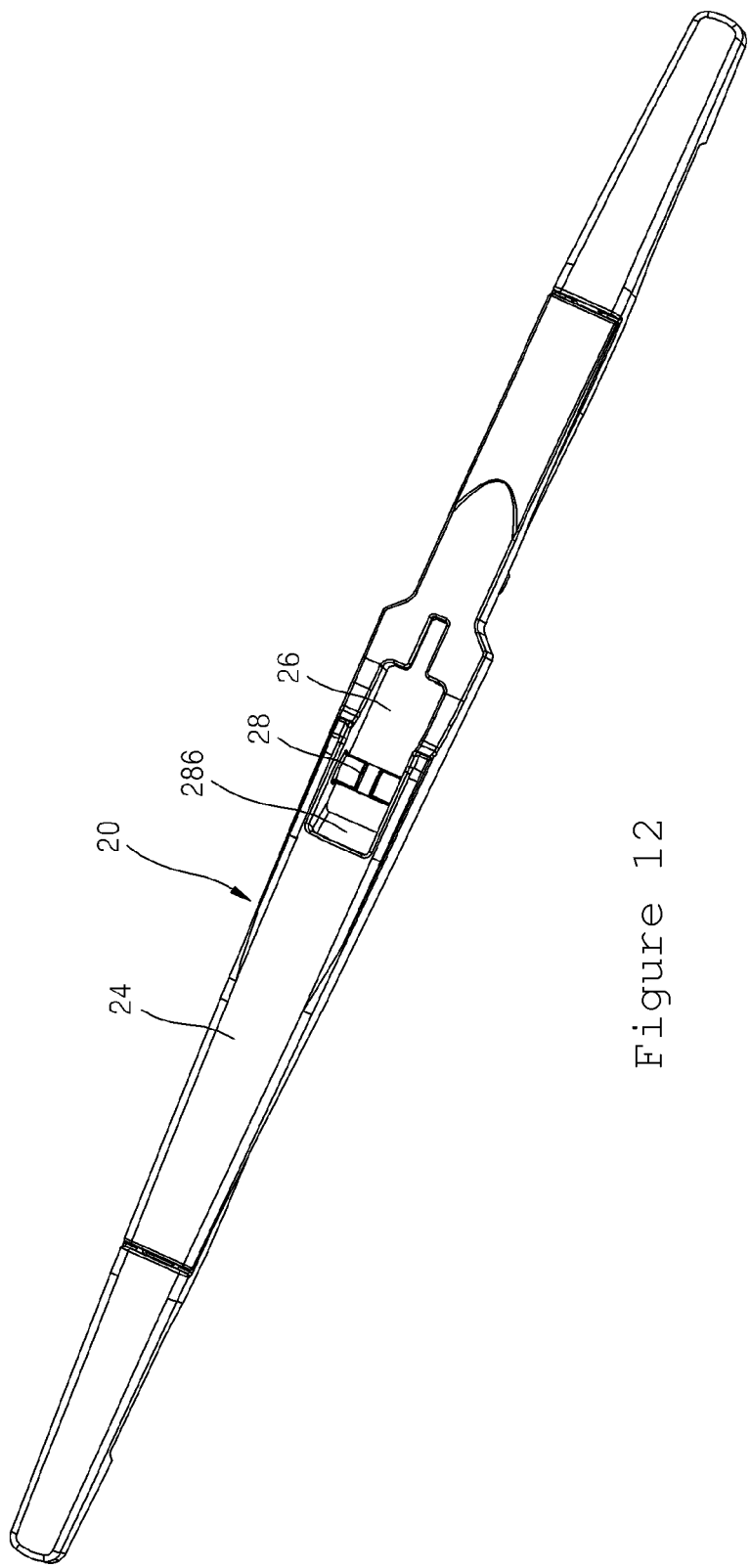
FIG. 12 is a diagram showing a main structure of the wiper blade in the wiper device of FIG. 10.

FIG. 10 is a diagram showing a wiper device 13 according to another embodiment of the present invention, FIG. 11 is a diagram showing a separation position between a wiper blade 20 and a retainer 30 in the wiper device 13 shown in FIG. 10, and FIG. 12 is a diagram showing a main structure of the wiper blade 20 in the wiper device 13 of FIG. 10.

Referring to FIGS. 10 through 12, the wiper device 13 having an improved structure for separating the wiper blade, according to another embodiment of the present invention, includes the wiper blade 20 and the retainer 30.

The wiper blade 20 includes the wiper rib 22 and the lever member 24. The wiper rib 22 is formed of a material having excellent flexibility such as rubber. The wiper rib 22 removes impurities on the glass of a vehicle by sliding on the glass of the vehicle while contacting the glass. That is, the wiper rib 22 cleans the glass. The lever member 24 is a member making the wiper rib 22 be firmly supported on the glass, and compresses the wiper rib 22 toward the glass surface. The lever member 24 generally includes a plurality of components. A member disposed on a center portion of the lever member 24 is referred to as a main lever. The main lever includes a structure for detachably coupling the retainer 30 and the lever member 24 on a center portion thereof. That is, the main lever includes a penetration hole 26. The penetration hole 26 penetrates through an upper surface and a lower surface of the main lever. A rotary shaft 28 is disposed across opposite side walls of the penetration hole 26. That is, the rotary shaft 28 is disposed in a width direction of the lever member 24. The rotary shaft 28 may be integrally formed with the lever member 24, or may be fabricated as an additional component to be coupled to the lever member 24, if necessary. The rotary shaft 28 includes a non-circular cross-section 29. The non-circular cross section 29 is formed to prevent the wiper blade 20 from separating unexpectedly from the retainer 30 during operation, by only assembling or separating the wiper blade 20 with or from the retainer 30 at a predetermined position.

The retainer 30 is a rod-shaped member. An end portion of the retainer 30 is coupled to an arm head. The other end portion of the retainer 30 is coupled to the wiper blade 20. The retainer 30 includes a receiving recess 32 that may receive the rotary shaft 28 to be detachable. The receiving recess 32 includes an opening 34 corresponding to the non-circular cross section 29 of the rotary shaft 28.

The present invention is characterized in that a user may recognize a coupling position or a separating position of the wiper blade 20 and the retainer 30 while performing a coupling operation or a separating operation. That is, the wiper device 13 includes an index unit that indicates the separating or coupling position of the wiper blade 20 from or to the retainer 30 when the wiper blade 20 rotates with respect to the retainer 30 within a predetermined angle range.

The index unit includes a bridge 286 and a contact portion 362.

The bridge 286 is disposed on the wiper blade 20. In more detail, the bridge 286 is disposed in front of the rotary shaft 28 of the wiper blade 20. The bridge 286 is formed to connect opposite inner walls of the penetration hole 26 to each other.

The contact portion 362 is disposed on a front end portion of the retainer 30. The contact portion 362 contacts the bridge 286 while the wiper blade 20 is rotated with respect to the retainer 30 so that the user may recognize the separating and assembling positions of the wiper blade 20 and the retainer 30. That is, at a position where the contact portion 362 contacts the bridge 286, the wiper blade 20 and the retainer 30 may be separated from or coupled to each other.

Hereinafter, operational effects of the index unit will be described in detail below.

FIG. 11 shows a state where the bridge 286 and the contact portion 362 contact each other. That is, the wiper blade 20 and the retainer 30 may be coupled to each other at the position shown in FIG. 11. At other positions than the position shown in FIG. 11, the coupling or separating of the wiper blade 20 and the retainer 30 is impossible. Therefore, the wiper blade 20 and the retainer 30 are arranged in the state shown in FIG. 11, and then, the rotary shaft 28 is inserted in the receiving recess 32 and rotated to the state shown in FIG. 10, and accordingly, the wiper blade 20 and the retainer 30 are coupled to each other. If there is a need to replace the wiper blade 20 with a new one in the state of FIG. 10, the wiper blade 20 is rotated with respect to the retainer 30 to the state shown in FIG. 11. In the state shown in FIG. 11, the contact portion 362 contacts the bridge 286 and the wiper blade 20 is not rotated any more, and thus, the user may easily recognize the coupling or the separating position of the wiper blade 20 and the retainer 30.

As described above, a wiper device of the present invention has an improved structure so that the user may exactly recognize the separating and coupling position of a wiper blade and a retainer, and accordingly, unexpected damage of the wiper blade or the retainer during the assembling or separating of the wiper blade and the retainer may be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wiper device having an improved separating function of a wiper blade, the wiper device comprising:
   the wiper blade comprising:
   a wiper for cleaning a glass of a vehicle;
   a lever member supporting the wiper rib; and
   a rotary shaft disposed across opposite side walls of a penetration hole formed in a center portion of the lever member, the rotary shaft including a non-circular cross section;
   a retainer comprising a receiving recess including an opening corresponding to the non-circular cross section so as to detachably receive the rotary shaft; and
   an index unit indicating a position where the wiper blade is coupled to or separated from the retainer while the wiper blade is rotated with respect to the retainer within a predetermined angle range;
   wherein the index unit comprises:
   a cantilever-shaped protrusion disposed in front of the rotary shaft of the wiper blade, and protruding from an inner wall of the penetration hole; and
   a sensor disposed on a front end portion of the retainer and contacting the cantilever-shaped protrusion while the wiper blade is rotated with respect to the retainer so that a user recognizes the position where the wiper blade and the retainer are coupled to or separated from each other.

2. The wiper device of claim 1, wherein a pair of the cantilever-shaped protrusions is symmetrically formed.

3. A wiper device having an improved separating function of a wiper blade, the wiper device comprising:
   the wiper blade comprising:
   a wiper rib for cleaning a glass of a vehicle;
   a lever member supporting the wiper rib; and
   a rotary shaft disposed across opposite side walls of a penetration hole formed in a center portion of the lever member, the rotary shaft including a non-circular cross section;
   a retainer comprising a receiving recess including an opening corresponding to the non-circular cross section so as to detachably receive the rotary shaft; and
   an index unit indicating a position where the wiper blade is coupled to or separated from the retainer while the wiper blade is rotated with respect to the retainer within a predetermined angle range;
   wherein the index unit comprises:
   a shaft protrusion disposed on the rotary shaft of the wiper blade and protruding in a radial direction of the rotary shaft; and
   a shaft protrusion receiving recess extending from a receiving recess of the retainer and which is rotatable within a predetermined angle range while receiving the shaft protrusion so that the user recognizes the position where the wiper blade and the retainer are coupled to or separated from each other.

4. A wiser device having an improved se unction of a wiser blade, the wiper device comprising:
   the wiper blade comprising:
   a wiper rib for cleaning a glass of a vehicle;
   a lever member supporting the wiper rib; and
   a rotary shaft disposed across opposite side walls of penetration hole formed in a center portion of the lever member, the rotary shaft including a non-circular cross section;
   a retainer comprising a receiving recess including an opening corresponding to the non-circular cross section so as to detachably receive the rotary shaft; and
   an index unit indicating a position where the wiper blade is coupled to or separated from the retainer while the wiper blade is rotated with respect to the retainer within a predetermined an angle range;
   wherein the index unit comprises:
   a bridge disposed in front of the rotary shaft of the wiper blade and formed to connect opposite inner walls of the penetration hole to each other; and
   a contact portion disposed on a front end portion of the retainer and contacting the bridge while the wiper blade is rotated with respect to the retainer so that the user recognizes the position where the wiper blade and the retainer are coupled to or separated from each other.

* * * * *